UNITED STATES PATENT OFFICE.

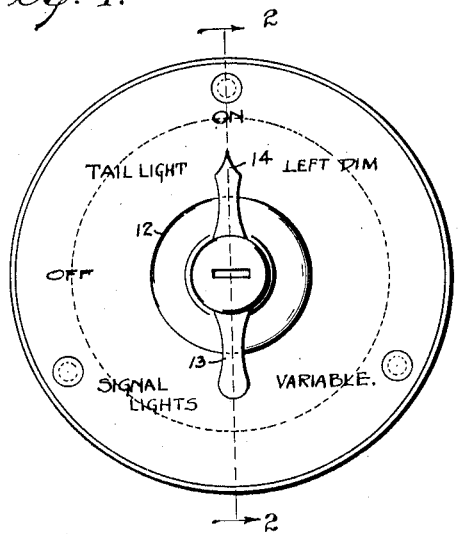
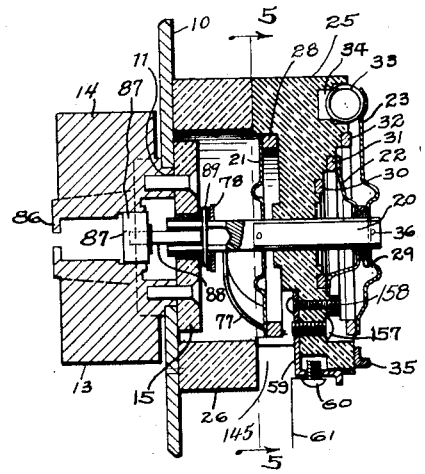
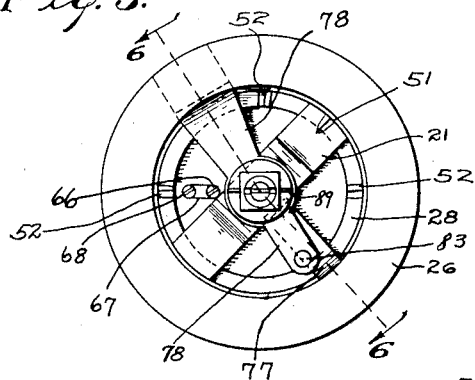
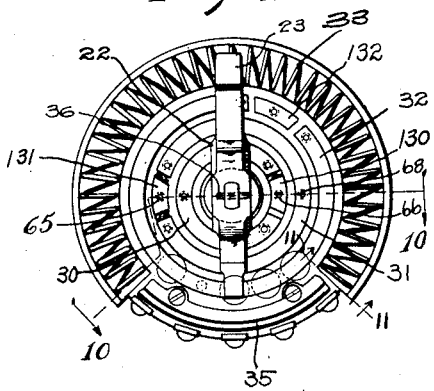
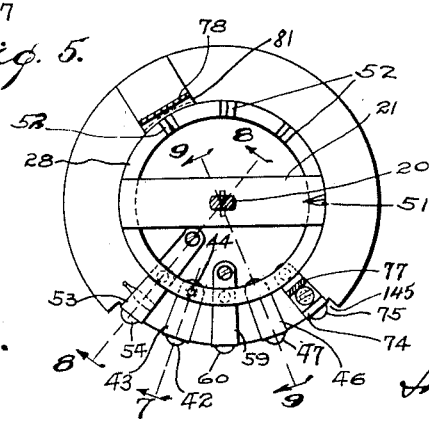

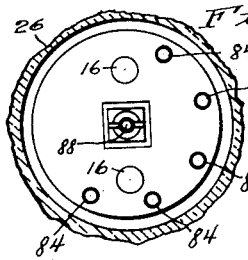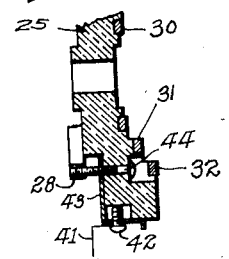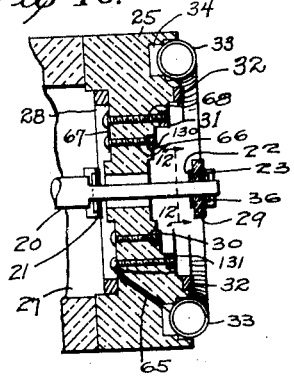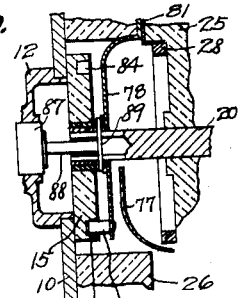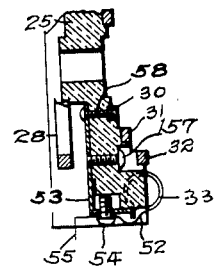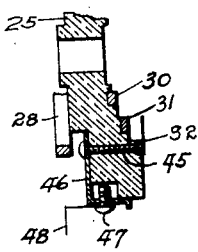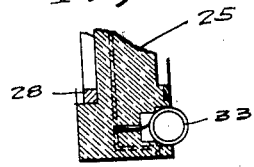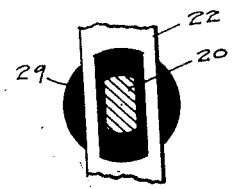

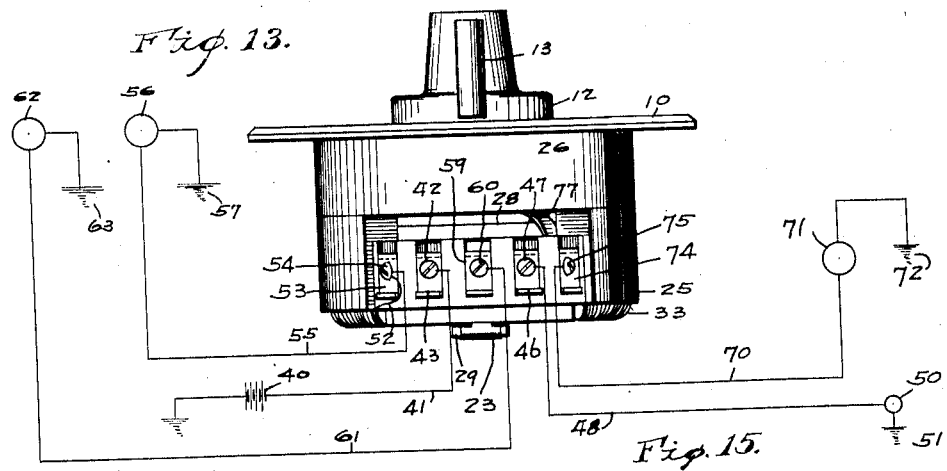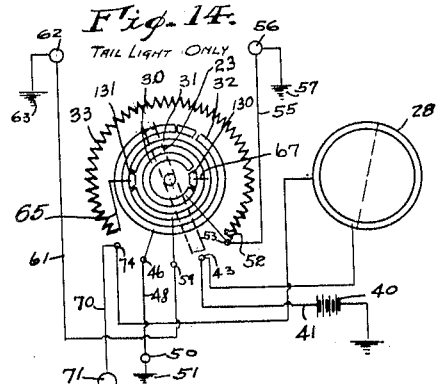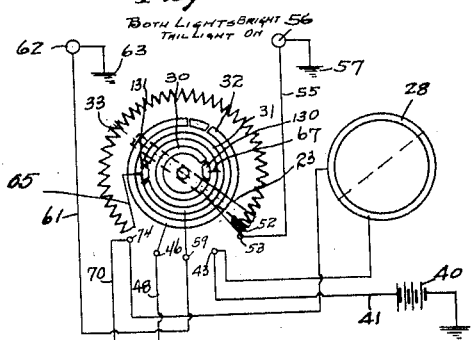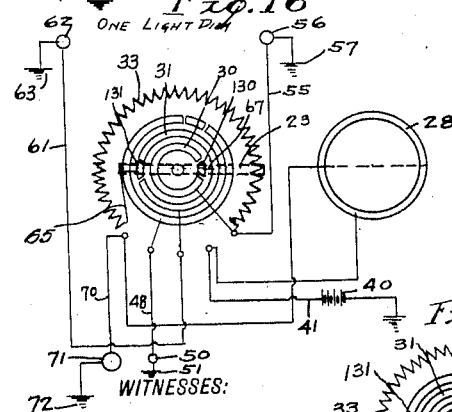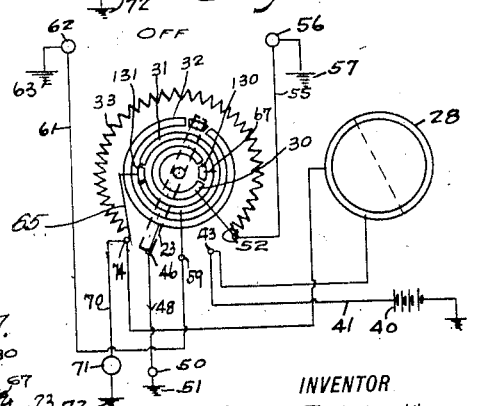

SAMUEL F. ARBUCKLE, OF INDIANAPOLIS, INDIANA.

ELECTRIC-LIGHTING SYSTEM.

1,223,134.     Specification of Letters Patent.     Patented Apr. 17, 1917.

Application filed January 24, 1916. Serial No. 74,058.

*To all whom it may concern:*

Be it known that I, SAMUEL F. ARBUCKLE, a citizen of the United States, and a resident of Indianapolis, county of Marion, and State of Indiana, have invented a certain new and useful Electric-Lighting System; and I do hereby declare that the following is a full, clear, and exact description thereof, reference being had to the accompanying drawings, in which like letters refer to like parts.

The object of this invention is the provision of a better electric lighting system for automobiles and the like than heretofore devised.

One feature of the invention consists in providing means whereby the chauffeur of an automobile can readily dim a lamp or light, say, the right-hand headlight and leave the left-hand headlight at full strength or any strength desired. This arrangement protects approaching drivers of vehicles from the glare of the left-hand head light and yet leaves the right-hand light going at full strength to illuminate the right-hand edge of the roadway and thus enable the chauffeur to see how to drive his automobile safely and prevent it from ditching or running into an obstruction at the right-hand side of the road. There has been great annoyance and danger to automobiles where the chauffeur was blinded by too strong a head light or where he dimmed both of his own head lights so that he could not see the right-hand edge of the roadway clearly and was liable to run into a ditch or other obstruction while approaching or passing other automobiles. And frequently serious accidents have happened from this trouble. With this improvement the right-hand light continues at full force to illuminate the right-hand side of the roadway and does not blind with its glare any persons approaching on the other side of the roadway. The left-hand light which causes the dangerous glare is dimmed and, therefore, with the one device both objects are accomplished, namely, the protection of approaching persons from the glare of the lamp and also the illumination of the right-hand side of the roadway to protect the automobile. Also the dim left-hand light is sufficiently strong to serve as a signal or warning to approaching automobiles and enable them to see how close they are coming to the automobile equipped with applicant's invention. Where the glare is not reduced neither automobile chauffeur can prevent collision as neither can see either automobile or the exact position of its left-hand side in the roadway and the same thing is true when the headlight is turned out.

Another feature of the invention consists in providing a means for dimming or brightening or shutting off either headlight or both, as desired, and also for gradually dimming both headlights until they are entirely shut off.

Another feature of the invention consists in providing such controlling means or signal, so that whenever the tail light is shut off, the headlight will be shut off. This is in order that the tail light would always be on necessarily when any other lights are on so that at night the car cannot be driven without the tail light being on. Also the arrangement is such that the tail lights cannot be turned off without turning off all of the other lights, particularly the headlights.

Another feature of the invention consists in providing a single switch for doing the following work: When the switch is in its first position, the tail light and all other lights on the same circuit as the tail light, will be turned on; when the switch is in the second position, said lights will be left on and the headlights will be turned on with full brilliancy; when the switch is in its third position, one of the head-lights will be dimmed to any degree desired and the other lights be left on unchanged except that the other headlight may be also slightly dimmed, if desired, without any of the other lights besides the headlights being dimmed; when in its fourth position, all lights will be brilliant, although the headlights will be slightly dimmed, and further advance movement of the switch will gradually dim the headlights, but leave the other lights brilliant, the headlights being gradually dimmed to a minimum; when the switch as at its fifth position, there is a snap signal indicating that the head lights are dimmed to their minimum; and when the switch is moved to the sixth position, all lights are off. If the switch be operated backward, the same effects will be produced, but in reverse order.

Another feature of the invention consists in arranging the switch so that it will be locked against operation unless it is unlocked by the insertion of a key in the switch and when said key is inserted in the switch, it causes a closing of the ignition circuit.

Another feature of the invention consists in combining a switch for controlling the lighting circuit with a switch or means for controlling the ignition circuit arranged so that the lighting switch cannot be operated until the ignition switch key is inserted and operated. In other words, means is provided for locking the lighting switch in any of its positions, as above defined, and it cannot be unlocked except by the use and operation of the ignition switch. This insures the closing of the ignition circuit at all times when the lighting switch is operated and prevents the actuation of the lighting switch excepting when the ignition circuit is closed. On the other hand, the locking key can be removed and the ignition circuit broken when the lighting switch is in any one of its positions so that the lights may continue although the ignition circuit is broken.

The full nature of the invention will be understood from the accompanying drawings and the following description and claims:

In the drawings, Figure 1 is an elevation of the device with the locking key removed. Fig. 2 is a transverse section on the line 2—2 of Fig. 1. Fig. 3 is an elevation of a portion of the device with the face plate and associated parts removed. Fig. 4 is an elevation of the right-hand or rear end of the device as shown in Fig. 2. Fig. 5 is a section on the line 5—5 of Fig. 2. Fig. 6 is a section through the entire device on the line 6—6 of Fig. 3, and showing the locking key in position. Fig. 7 is a section on the line 7— of Fig. 5. Fig. 8 is a section on the line 8—8 of Fig. 5. Fig. 9 is a section on the line 9—9 of Fig. 5. Fig. 10 is a section on the line 10—10 of Fig. 4. Fig. 11 is a section on the line 11—11 of Fig. 4. Fig. 12 is a section on the line 12—12 of Fig. 10, on a larger scale and parts being broken away. Fig. 13 is a bottom view of the device with a diagram of the external wiring associated therewith. Fig. 14 is a diagram of both the internal and external wiring showing the parts in position when the tail light only is turned on. Fig. 15 is the same diagram when both the headlights are bright and the tail light is on. Fig. 16 is a similar diagram when one of the headlights is dimmed. Fig. 17 is a similar diagram partly shown when both headlights are dim. Fig. 18 is a similar diagram when all of the lights are off. Fig. 19 is a section on the line 19—19 of Fig. 6, showing inside elevation of the disk. Fig. 20 shows a portion of Fig. 6 with the switch locked.

In this device, as shown for the purpose of illustrating the general nature of the invention, there is a circular face plate 10 adapted to be secured to some part of an automobile, preferably the rear surface of the dash. It has a central circular opening in it to receive a collar 11 extending inward from a base 12 of a finger piece 13. Said finger piece also has an indicator 14 integral therewith. The base 12 is turned or rotated by the finger piece and the index refers to words on the face plate which state the different positions of the switch.

On the inside of the face plate 10 there is a disk 15 made of insulating material which is secured by screws 16 to the base of the finger piece, as shown in Figs. 2 and 6. Therefore, the disk 15 rotates with the finger piece and it has a central square opening through which a square post or stem 20 extends, so that when the finger piece is turned, said disk 15 will turn said post or stem. Said post is made of metal or other conducting material and extends through and turns three diametrically extending spring plates 21, 22 and 23. Said stem extends through and turns in an opening or hole through the switch base 25 which is made of insulating material and has a cylindrical extension 26 secured to the face plate 10 and made of insulating material. It is immaterial whether the parts 25 and 26 are separate or integral, as they are both stationary with the face plate 10.

There is a chamber 27 between the face plate 10 and the switch base 25 and within said chamber a metal ring 28 is secured to the inner surface of the switch base 25 so that the ends of the spring metal plate 21 will bear and travel upon said ring as said plate 21 is turned and be always in electrical connection therewith and the current from the battery, hereafter explained, enters through the ring 28, plate 21 and stem 20 and is conducted to plate 23, as hereafter explained. The plates 22 and 23 are insulated from each other by a rubber disk 29 and plate 22 is insulated from the post 25 by the disk 29.

The rear surface of the switch base 25 is cylindrically stepped and has secured to it an inner metal ring 30, a second metal ring 31 of greater diameter, and a third metal ring 32 of still greater diameter. One end of the spring metal plate 23 bears upon the outer ring 32 and the other end bears and travels upon a resistance coil 33, segmental in form, as appears clearly in Figs. 4 and 14. Said resistance coil lies in a recess 34 in the switch base and is secured at intervals to said switch base. The gap between the ends of said resistance coil 33 is filled by a plate 35 of non-conducting material, segmental in form and rigidly secured in said recess 34 to the switch base and arranged so that its rear edge will be flush and in alinement with the rear edge of the resistance coil 33 so that the longer end of the spring plate 23 can travel and not contact with said coil 33 and plate 35 when the finger piece 13 and stem 20 are turned in either direction. The spring plate 23 is held on the stem 20 by a pin 36.

The rings 30, 31 and 32 are formed, as shown in Fig. 4. The inner ring 30 is broken at two points to make the short segment 130 and the two parts of said ring are separated by non-conducting material. The ring 31 is likewise formed of two parts, one being a short segment 131 and said short segment 131 in ring 31 is diametrically opposite the short segment 130 of ring 30. Therefore, the spring plate 22 will bridge either the two longer portions of the rings 30 and 31, or the two shorter segments 130 and 131. The outer ring 32 is likewise formed of a longer portion and a shorter segment 132. The segment 132 need not be of metal necessarily, and it has no electrical connection of any kind and when the spring plate 23 is in contact with that small segment 132, the lines are all cut out.

The electrical connections with the rings 28, 30, 31 and 32 are constructed as follows: The current leaves the battery 40, shown in the diagram in Fig. 13, and passes over the line 41 to a bind screw 42, shown in Fig. 7, and metal plate 43 secured to the switch base 25 by a screw 44 through which the current passes to the ring 28. The switch base 25 is segmentally cut out at 145, as indicated in Fig. 6, for the purpose of connecting these electrical connections with the rings. The current passes from the ring 28 through the stem 20 and through plate 23 to ring 32 and therefrom through the electrical connections shown in Fig. 9. From said ring the current passes through a screw 45, plate 46, screw 47 and wire or line 48 and goes to the tail lamp 50 and therefrom to the ground at 51, as indicated in Fig. 13. This tail light, therefore, will always be lighted during the turning movement of the switch until the short end of the spring plate 23 comes upon the short segment 132 of the outer ring 32, shown in Fig. 4, and heretofore described as being insulated and having no electrical connection. When it is in that position, the tail light will be out. When the device is in idle position and all lights are "off", the short end of the spring plate 23 is located on said short segment 132, as indicated in Fig. 18.

As soon as the switch is turned so as to move said plate 23 onto the main part of ring 32, then the tail light will be on and that constitutes what may be termed the first position of the lighting switch. The fact that it reaches the first position is made known by a click or signal caused by a rib 51 on the metal plate 21 entering a notch 52 in the ring 28. The rib and notch are beveled so that it will not interfere with further turning movement of the metal plate 21. Also such position is indicated by the pointer 14 pointing toward the words "Tail light" on the face plate 10.

The next movement to the right of the finger piece until said rib on the metal strip 21 enters another notch 52 in the ring 28, brings the light switch into the second position, which leaves the tail light burning and starts the two headlights. In that position, the long end of the strip 23 at the rear end of the device moves to the high voltage end of the resistance coil. The electrical connection with such end of the resistance coil is shown in Fig. 8. It consists of a wire 152 or one end of the coil connected with a plate or binding post 53 and the current passes therefrom through a screw 54 to line 55, see Fig. 13, and then to the right-hand head light 56 and thence to ground at 57. The binding plate or post 53 is held in place by a screw 157 so as to be connected by a screw 58 with the large segment of the inner ring 30. A portion of the current passes through the binding plate or post 53 into the larger segment of the inner ring 30 and therefrom through the short end of the spring plate 22 to the large segment of the ring 31 and from that ring, as shown in Fig. 2, the current passes through the screw 158, binding plate 59, screw 60 and line 61, as seen in Fig. 13, to the left-hand headlight 62 and thence to ground 63. Therefore, both headlights will be turned on with full and equal brilliancy. When in this position the pointer 14 points toward the word "On", as indicated by diagram in Fig. 15.

When the finger piece or switch is given a further movement until the rib 51 on the plate 31 enters another notch 52 in the ring 28, the pointer 14 will point toward the words "Left dim" on the plate 10. That means that the left-hand headlight 62 is dimmed while the right-hand headlight 56 is still brilliant and the tail light is still on, as indicated by diagram in Fig. 16. By referring to Fig. 16 and the resistance coil therein, it will be seen that the current going to the left or dimmed headlight extends from the point where the plate 23 engages said coil to the left entirely to the end of the coil, while the resistance in the circuit going to the right-hand or more brilliant headlight is only that portion of the coil lying between the plate 23 and the right-hand end of the coil. Therefore, while there is some resistance in the circuits to both lamps, there is a very great difference in the amount of resistance.

The mechanism whereby the above result is accomplished is as follows: The circuit for the right-hand or more brilliant light is the same as heretofore excepting that there is some of the resistance coil now in the circuit in view of the movement of the plate 23 for a slight distance along said coil. The current for the dimmed head-light travels as follows: The current from the plate 23 travels through the longer or left-hand portion of the resistance coil and through the connection 65 to the short segment or portion 131 of the ring 31. Thence it goes to the plate 22 which bridges said part 131 of the middle ring and part 130 of the inner ring 30. The current then passes from the short part 130 of the ring 30 through a bolt 66, see Fig. 10, which extends through the switch base 25 to the inner surface of the switch base and thence through a metal connection 67 to a post 68 which extends back to the main part of the middle ring 31 and thence it passes through screw 158, plate 59, screw 60 and line 61 to the left or dimmed light 62.

Soon after the switch is started from the third position, the spring plate 22 moves away from the portions 130 and 131 of the inner and middle rings 30 and 31 upon the longer segments or portions of said rings. The current which comes in over the spring plate 23 now travels to the right through the resistance coil to its right-hand end and then a part of it out through line 55 to the right-hand headlight and a part of it through the connection 53, see Figs. 8 and 16, to the inner ring 30 and since it is bridged with the middle ring 31, the current passes to said middle ring and out through line 61 to the other headlight. This will give both headlights equal brilliancy, but obviously as the switch is operated further and the spring plate 23 is caused to travel to the left on the resistance coil, as indicated in Fig. 16, the amount of resistance in the circuits to the two headlights will be gradually increased and the power of said lights correspondingly gradually diminished until the end of the resistance coil is reached, when the light in said headlights will be reduced to the minimum. During this part of the operation, the pointer 14 passes over the section of the plate marked, "Variable", and the power of the headlights is reduced when the switch is turned until it is stopped in the fourth position by another notch 52 in the ring 28. Then the pointer 14 points toward the portion of the plate 10 marked "Signal lights", by which is meant the two dimmed headlights. However, the tail light is still on.

Further turning of the switch will bring it to the off position when all lights will be turned off. This is the fifth position and at that time the pointer 14 will point toward the word "Off" on the plate 10. The off position of the parts has already been described and is indicated by diagram in Fig. 17.

The ignition circuit leads from this device through a wire 70 to the spark plugs of the engine 71 and thence to the ground at 72, as shown in Fig. 13. The wire 70 is connected with a plate 74 by a screw 75, as shown in Figs. 13 and 6. The plate 74 is secured to the switch plate 25 by a screw 76. A metal plate or conductor 77 is connected with the plate 74 and extends in the chamber 27 almost to the stem 20, as seen in Fig. 6, where it is adapted to be engaged by a spring metal plate or conductor 78 when its free end is depressed by the insertion of the locking key 80 and thus the ignition circuit be closed. Such ignition circuit leads from the ring 28 which is shown to be electrically connected with the plate 78 by a metal plate 81. These two plates 78 and 81 are secured together and clamped and held between the switch base 25 and the cylindrical member 26, as seen in Fig. 6, but the connection between the parts 27 and 78 is not limited to the details shown.

Therefore, the current for both the lighting and ignition circuits comes from the same battery through line 41 and connection 43 and metal plate or strip 21 and ring 28. These connections and conductors are in common with both the lighting and ignition systems.

The spring plate 78 carries a pin 83 adapted, when the plate 78 is not depressed by the key 80, to project into one of the holes 84 in the stationary disk 15 which is fastened to the base plate 10, as shown in Fig. 6. That locks the lighting system from further manipulation or change until the key is inserted for unlocking the lighting switch and when the key unlocks the lighting switch so that it can be further operated, it, at the same time, turns on the ignition system. When the lighting switch is locked from further operation, however, it does not mean that the lights are all off. For there is one of these holes for each of the positions of the lighting switch heretofore defined so that when the key is removed, the lighting switch is locked in one of said positions and if any of the lights are on when the lighting switch is in that position, said lights will continue, although the ignition system is not in operation. This renders the combination with the ignition system a very important improvement, as it enables one device to control both the lighting and ignition systems and the key which controls the ignition system to lock the lighting switch and to lock it with the lighting switch in operation, if desired. Also when the car is standing and the ignition system is not in operation, the device prevents any one from tampering with the lights, which is an important feature.

The details of the locking mechanism are as follows: The finger piece 13 of the lighting switch has a key hole 85 extending through it, as shown in Figs. 2 and 6, the inner portion of said key hole being cylindrical and relatively enlarged, while the outer portion is provided with shoulders 86 having a slot between them merely large enough for the insertion of the key. When the key is partially inserted in said key hole, it engages a plunger head 87 operating in the key hole and secured to a plunger rod 88 operating in the central opening in the metal stem 20 and having a disk 89 on its lower end adapted to engage the free end of the spring plate 78 which loosely surrounds the stem 20. When the key is pushed in to its limit, as shown in Fig. 6, it will depress the spring plate 78 from the position shown in Fig. 20 to that shown in Fig. 6, and bring it into contact with the plate 77 and thus close the ignition circuit. When the key is in to its limit, it is turned so that the outer wing 90 of the key will pass under the shoulders 86, whereby said shoulders will hold said key in and through the plunger 88 hold the plates 77 and 78 in circuit closing position, as shown in Fig. 6. When the key 80 is in this position, the ignition system is in operation and the lighting switch can be turned and operated to any desired position. But as soon as the key 80 is removed, the spring plate 78 will return, moving out of engagement with the plate 77 and forcing the pin 83 into a hole 84 in the disk 15 and thus lock the lighting switch in the position in which it happens to be at that time.

It is obvious to electricians and those skilled in the art that the details of this mechanism can be changed in many particulars without in any wise departing from the spirit or principle of this invention and, therefore, I do not wish to be considered as limiting my invention to the details of construction shown and described, nor do I wish this invention to be limited to any particular construction or arrangement of rheostat, whether it consists of one resistance coil, or more, or some other form of rheostat; nor is this invention limited to use in connection with automobiles as it can be used on steam boats and other water crafts, on trains and interurban cars and in many other situations.

The invention claimed is:

1. The combination with an automobile, electric headlights therefor, and an electric lighting system for lighting said lights, of means for controlling the current in said circuit which in one position can dim one of said headlights without dimming the other, and when further operated, will dim both of said headlights.

2. The combination with an automobile, electric headlights therefor, and an electric lighting system for lighting said lights, of means for controlling the current in said circuit which in one position can dim one of said headlights without dimming the other, and when further operated, will gradually dim both of said headlights.

3. The combination with an electric lighting system, and an ignition system for an internal combustion engine, of a single switch construction for controlling the operation of said systems, means for locking said switch from operation when the ignition system is not in operation, and a key insertible in said switch construction for unlocking said switch construction and at the same time causing the operation of the ignition system.

4. The combination with an automobile, electric headlights therefor, and an electric circuit for said lights, of a switch for controlling the current, which switch includes a resistance unit arranged so that the current of both headlights will pass through said resistance unit and be gradually dimmed as the switch is operated and the portion of the resistance unit through which the current passes is gradually increased.

5. An electric lighting system including a plurality of lights, a resistance coil with one end thereof in electrical communication with one of said lights and the other end in electrical communication with the other of said lights, and means through which the current comes arranged to engage the resistance coil near one end thereof so that current from one light will pass through the major portion of said resistance coil and be dimmed while the other light will be relatively brilliant.

6. The combination with an electric lighting system, including a plurality of lights and an ignition system for an internal combustion engine, of a single switch construction for controlling the operation of said systems, means for locking said switch from operation when the ignition system is not in operation, a key insertible in said switch construction for unlocking said switch construction and at the same time causing the operation of the ignition system, and means for dimming said lights.

7. The combination with an electric lighting system, a plurality of lights including headlights and an ignition system for an internal combustion engine, of a single switch construction for controlling the operation of said systems, means for locking said switch from operation when the ignition system is not in operation, a key insertible in said switch construction for unlocking said switch construction and at the same time causing the operation of the ignition system, and means for dimming one or both of said headlights as desired.

8. The combination with an automobile having electric headlights and an ignition circuit for said automobile, of electric lighting circuits for lighting said lights, including a single means for closing the ignition circuit and for controlling the current in said lighting circuits which in one position can dim one of said headlights without dimming the other, and when further operated, will dim both of said headlights.

9. The combination with an automobile, and an ignition circuit for said automobile, of an electric lighting system including a plurality of lights, an electric circuit for supplying current thereto, and a single switch construction for controlling the current in both of said circuits, which in one position will maintain said light brilliant, and during a part of the operation thereof will dim as many lights as desired.

10. The combination with an automobile, and an ignition circuit for said automobile of an electric lighting circuit including a plurality of lights, a single circuit for supplying the same with a current, a single switch construction for controlling both of said circuits and a single resistance unit forming a part of said switch and arranged to dim one of said lights without dimming all of the lights.

11. The combination with an automobile, including an ignition circuit of an electric lighting system including a plurality of lights, an electric circuit for supplying current thereto, and a single switch construction for controlling the current in both of said circuits which in one position will maintain said light brilliant and during a part of the actuation, by the operation thereof will gradually dim as many lights as desired.

12. The combination with an electric lighting system, including a plurality of lights and an ignition system for an internal combustion engine, of a single switch construction for controlling the operation of said systems, means for locking said switch from operation when the ignition system is not in operation, a key insertible in said switch construction for unlocking said switch construction and at the same time causing the operation of the ignition system, and means for gradually dimming said lights.

13. The combination with an electric lighting system, including a plurality of headlights, a single switch construction for controlling the operation of said lights, means for locking said switch from operation, a key insertible in said switch construction for unlocking it, and means for gradually dimming said headlights.

14. The combination with an electric lighting system, a plurality of lights including head lights, a single switch construction for controlling the operation of said lights, means for locking said switch from operation, a key insertible in said switch construction for unlocking it, and means for gradually dimming one or both of said head lights as desired.

15. The combination with an electric lighting system, a plurality of lights including head lights and an ignition system for an internal combustion engine, of a single switch construction for controlling the operation of said systems, means for locking said switch from operation when the ignition system is not in operation, a key insertible in said switch construction for unlocking said switch construction and at the same time causing the operation of the ignition system, and means for gradually dimming one or both of said head lights as desired.

In witness whereof, I have hereunto affixed my signature.

SAMUEL F. ARBUCKLE.